(12) United States Patent
Onozawa

(10) Patent No.: US 8,411,338 B2
(45) Date of Patent: Apr. 2, 2013

(54) IMAGE'S CHROMATISM CORRECTION APPARATUS

(75) Inventor: Masaru Onozawa, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 1329 days.

(21) Appl. No.: 11/516,117

(22) Filed: Sep. 6, 2006

(65) Prior Publication Data
US 2007/0052989 A1 Mar. 8, 2007

(30) Foreign Application Priority Data

Sep. 7, 2005 (JP) .................. 2005-258624

(51) Int. Cl.
*G03F 3/00* (2006.01)
*H04N 1/60* (2006.01)
*H04N 1/407* (2006.01)
*G06T 5/00* (2006.01)

(52) U.S. Cl. ........ 358/518; 358/1.9; 358/3.26; 358/3.27

(58) Field of Classification Search .............. None
See application file for complete search history.

(56) References Cited

U.S. PATENT DOCUMENTS

| | | | | |
|---|---|---|---|---|
| 6,747,702 | B1 * | 6/2004 | Harrigan ................. | 348/335 |
| 7,057,659 | B1 * | 6/2006 | Mihara et al. .............. | 348/345 |
| 7,245,319 | B1 * | 7/2007 | Enomoto ................ | 348/222.1 |
| 7,391,926 | B2 * | 6/2008 | Arazaki ................. | 382/275 |
| 2004/0150732 | A1 * | 8/2004 | Yamanaka ................ | 348/272 |
| 2004/0240726 | A1 * | 12/2004 | Stavely et al. ............ | 382/162 |
| 2005/0168614 | A1 * | 8/2005 | Okada et al. ............. | 348/335 |
| 2006/0017855 | A1 * | 1/2006 | Yamada .................. | 348/650 |
| 2006/0251322 | A1 * | 11/2006 | Palum et al. .............. | 382/167 |

FOREIGN PATENT DOCUMENTS

| | | |
|---|---|---|
| JP | 10-66097 A | 3/1998 |
| JP | 2001-78038 A | 3/2001 |
| JP | 2003-060983 A | 2/2003 |
| JP | 2004-153323 A | 5/2004 |
| JP | 2004-274133 A | 9/2004 |
| JP | 2005-25448 A | 2/2005 |

OTHER PUBLICATIONS

Japanese Office Action dated Nov. 9, 2010 (and English translation thereof) in counterpart Japanese Application No. 2005-258624.

* cited by examiner

*Primary Examiner* — David K Moore
*Assistant Examiner* — Peter L Cheng
(74) *Attorney, Agent, or Firm* — Holtz, Holtz, Goodman & Chick, P.C.

(57) ABSTRACT

A reference pixel PB is specified for a specified pixel P0 whose (luminance) value is below a threshold, for example, in the RGB data obtained in image pickup. The reference pixel PB should be on a straight line passing through the specified pixel P0 and the center O of the image and spaced from the specified pixel P0 by a distance, dr, depending on a reduction or expansion rate of a blue component (or B) image of the optical image corresponding to an optical zoom magnification in the image pickup. Only when the B value of the specified pixel P0 is greater than that of the reference pixel PB, the B value of the specified pixel P0 is replaced with that of the reference pixel PB. By expanding or reducing the blue component image alone for the original RGB data, image data is obtained in which the magnification chromatism is corrected. Thus, a chromatism correction apparatus that corrects a chromatism in the picked-up image without using a special lens in the optical system, and a program for use in implementing such apparatus are provided.

8 Claims, 13 Drawing Sheets

FIG. 2

| ZOOM MAGNIFICATION | COLOR COMPONENT MAGNIFICATION |
|---|---|
| 1 | K(1) |
| ⋮ | ⋮ |
| n | K(n) |

100

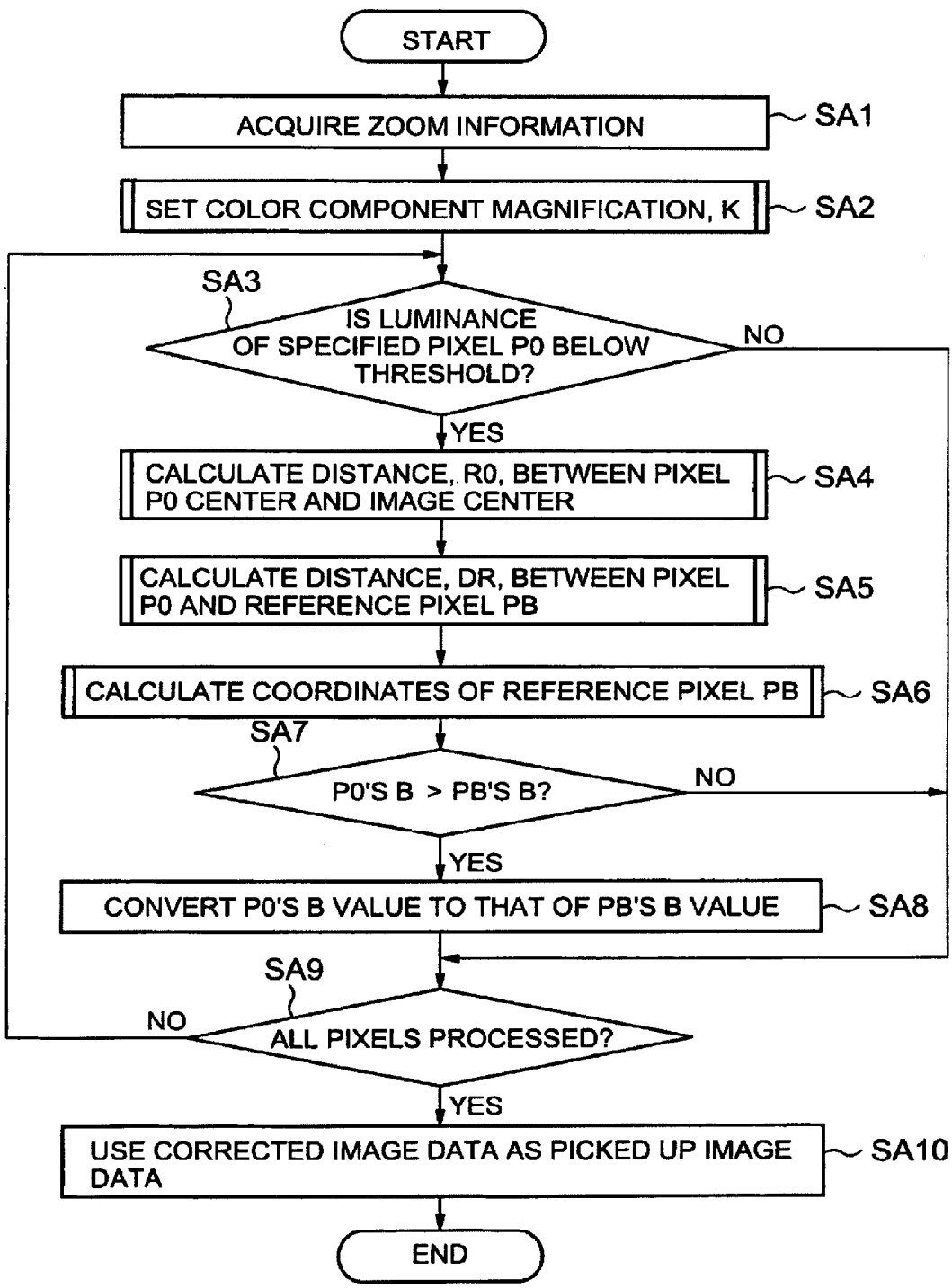

| TYPE NAME | ZOOM MAGNIFICATION | COLOR COMPONENT MAGNIFICATION |
|---|---|---|
| AAA | 1 | K(1) |
| | . | . |
| | . | . |
| | . | . |
| | n | K(n) |
| BBB | 1 | K(1) |
| | . | . |
| | . | . |
| | . | . |
| | n | K(n) |
| CCC | 1 | K(1) |
| | . | . |
| | . | . |
| | . | . |
| | n | K(n) |
| DDD | 1 | K(1) |
| | . | . |
| | . | . |
| | . | . |
| | n | K(n) |

IMAGE'S CHROMATISM CORRECTION APPARATUS

BACKGROUND OF THE INVENTION

1. Field of the Invention

The present invention relates to digital cameras and more particularly to a chromatism correction apparatus for use in a digital camera.

A lens of a camera or the like has a chromatism characteristic. The chromatism represents color blurs occurring along the contour of an object image because the wavelength components of the image light that has passed through a lens have different refractive indexes and the corresponding images formed on an imaging plane are different in position and size, (which are called axial and magnification chromatisms, respectively).

FIG. 4 illustrates the principle of occurrence of a magnification chromatism that greatly causes a deterioration in the contour expression of the picked-up image when the lens 100 is composed of a single piece. As shown in FIG. 4A, purple, green and red light components of white light L incident obliquely to the lens 100 are imaged concentrically on a plane radially outward in this order, or in order of increasing wavelength, because the refractive index varies from wavelength to wavelength. Thus, as shown in FIG. 4B, the magnifications of the optical images focused by the optical system on the imaging plane 101 differ from wavelength (or color) to wavelength (or color). Actually, the lens comprises a plurality of sublenses and the order of arrangement and magnifications of the respective wavelength images differ depending on a combination of different types of sublenses included in the lens.

With a digital camera using lenses of low telecentricity, the chromatism becomes especially remarkable also due to the structure of a CCD included. A general user can view on a computer an image picked up by the digital camera in an unimaginably large size compared to that of the image recorded on a conventional film-based camera. Thus, with the digital camera, even the general user can notice phenomena (including deviations and color blurs of the picked-up images) due to chromatism while with the film-based camera only professional photographers can notice similar phenomena. Thus, with image pickup devices such as digital cameras, the chromatism has come to be seen as a bigger problem than ever.

Conventionally, in order to eliminate the chromatism the optical system is composed of special lenses such as non-spherical lenses or abnormal dispersion lenses, for example, as disclosed in Unexamined Published Japanese Patent Application 10-66097.

However, when the chromatism is removed using special lenses such as just mentioned above, high designing and processing techniques are required for making such special lenses. Thus, when digital cameras implements such special lenses in the image pickup units thereof, the optical systems are expensive. Furthermore, the problem with the digital cameras is that the chromatism of the picked-up image cannot be eliminated unless the special lenses are used.

SUMMARY OF THE INVENTION

In one aspect, the present invention provides a chromatism correction apparatus for correcting a chromatism occurring in image data picked up by an image pickup device through an optical system, the apparatus comprising: determining means for determining whether a luminance value of a specified one of pixels of an image based on the image data is below a threshold; and converting means for converting the value of a predetermined color component of the specified pixel whose luminance value is determined to be below the threshold by the determining means to a different pixel value.

In another aspect, the present invention also provides a chromatism correction apparatus for correcting a chromatism on image data picked up by an image pickup device through an optical system, the apparatus comprising: reference pixel setting means for selecting and setting a pixel as a reference pixel on an image based on the image data at a position depending on a characteristic of chromatism of the optical system on a straight line passing through a specified pixel of the image and its center; determining means for determining whether a pixel value of a predetermined color component of the specified pixel is greater than that of the same color component of the referent pixel as the predetermined color component of the specified pixel; and converting means for converting to a different pixel value the pixel value of the predetermined color component of the specified pixel determined to be greater than that of the same color component of the reference pixel as the predetermined color component of the specified pixel.

In still another aspect, the present invention also provides a chromatism correction apparatus for correcting a chromatism on image data picked up by a pickup device through an optical system, the apparatus comprising: confirm pixel setting means for selecting and setting on an image based on the image data a plurality of pixels as a like number of confirm pixels arranged adjacent to a specified pixel of the image on a straight line passing through the specified pixel and the center of the image; determining means for determining whether there is a particular pixel having a luminance value higher than a predetermined threshold among the plurality of confirm pixels set by the confirm pixel setting means; and converting means, responsive to the determining means determining that there is a particular pixel, for converting the pixel value of the predetermined color component of the specified pixel to a different pixel value.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 2 schematically illustrates a magnification table for use in the first embodiment;

FIG. 3 is a flowchart indicative of a chromatism correction process to be performed in the embodiment;

FIG. 11 schematically illustrates a magnification table for use in the third embodiment;

DETAILED DESCRIPTION OF THE EMBODIMENTS

Embodiment 1

Figure 1:
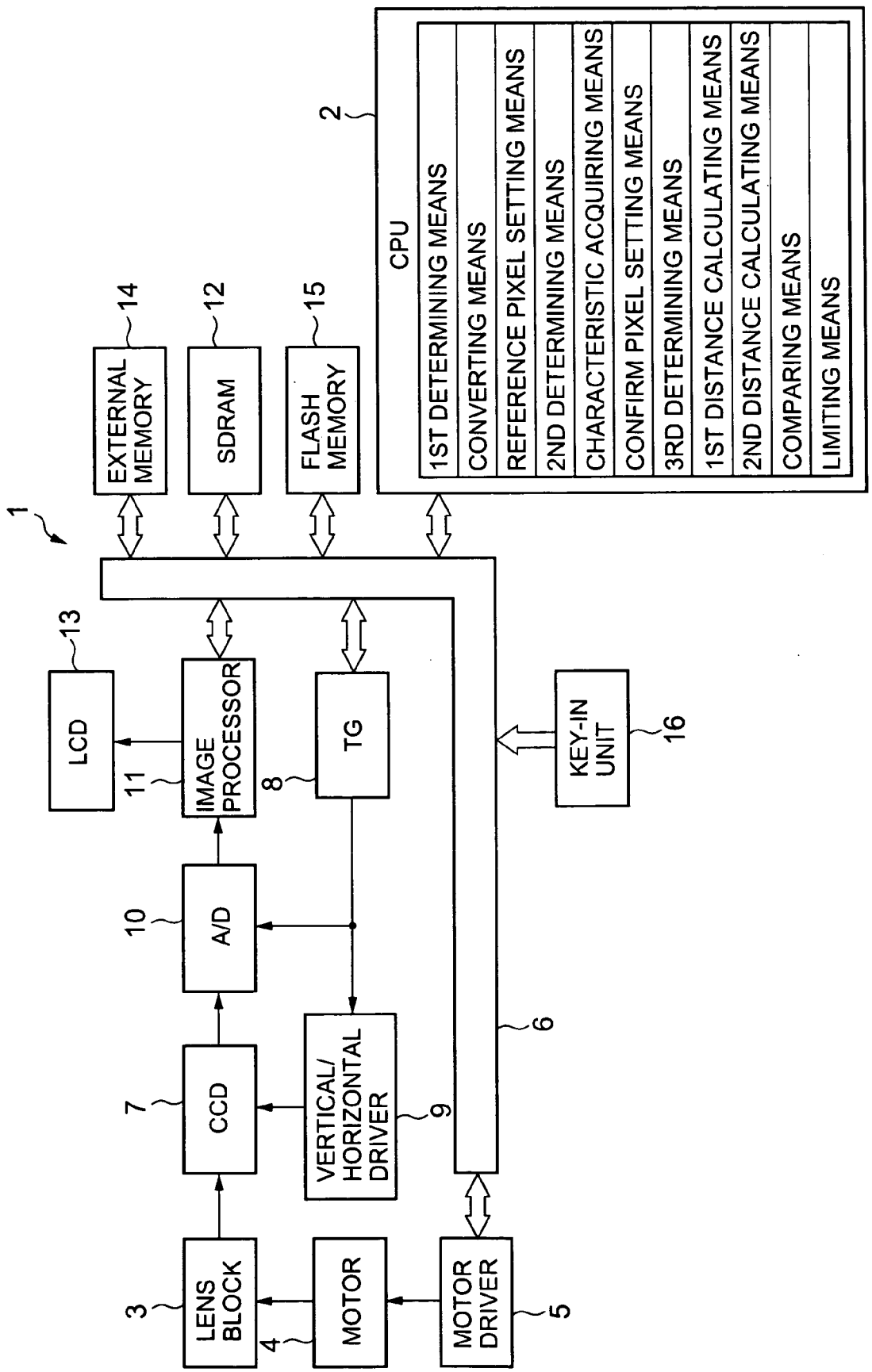
FIG. 1 is a block diagram of a digital camera according to one embodiment of the present invention.

An embodiment 1 of the present invention will be described with reference to the accompanying drawings. FIG. 1 is a block diagram indicative of an electric composition of a digital camera including a chromatism correction apparatus in the embodiment of the present invention. The digital camera 1 includes general functions such as an AE (Automatic Exposure), AWB (Auto White Balance) and AF (Auto Focus) and comprises a core CPU 2 that controls the whole system and other components, which will be described below.

In FIG. 1, a lens block 3 comprises an optical system including retractable zoom and focus lenses (not shown) and a drive mechanism (not shown) for the optical system that is driven by a drive motor 4, which is, in turn, driven by a motor driver 5. The motor driver 5 is connected via a bus 6 to the CPU 2. The motor 4 should include separate submotors for zooming and focusing purposes, respectively (not shown). When the motor driver 5 drives the motor 4 in accordance with control signals from the CPU 2, the zoom magnification and focusing of the optical system are adjusted and the optical system is extended/retracted from/into the camera body when the power source (not shown) is turned on/off.

The digital camera 1 includes a CCD 7 as an image pickup unit, which is driven by a vertical/horizontal driver 9 based on timing signals produced by a timing generator (or TG) 8 in accordance with commands from the CPU 2, and outputs to an analog signal processor 10 an analog picked-up image signal corresponding to an optical image of an object focused by the optical system. The analog signal processor 10 includes a CDS circuit that eliminates noise contained in the output signal from the CCD 7 in a correlation double sampling process and an A/D converter that converts an analog noiseless picked-up image signal to a digital image signal (or bayer data), which is then delivered to an image processor 11.

The image processor 11 performs an RGB conversion that produces R, G and B (hereinafter expressed as RGB) color component data of each pixel from the bayer data, a YUV conversion that produces YUV data including luminance Y data and color difference UV data from the RGB data, auto white balance, contour emphasis and pixel interpolation/extrapolation. The respective YUV data produced by the image processor 11 are stored sequentially in a SDRAM 12. Each time one frame image data is stored in an image pickup record mode, the image data is converted to a video signal, sent to a liquid crystal monitor (or LCD) with a backlight 13, and then displayed as a through image on the LCD 13.

The respective image data stored temporarily in the SDRAM 12 are compressed by the CPU 2 when the still and moving images are picked up in the record mode, and recorded finally in an external memory 14 as a (still or moving) image file of a predetermined format. The external memory 14 comprises a memory card set removable in the camera connected via a card interface (not shown). The image file recorded in the external memory 14 is read and extended into the CPU 2 in the reproduce mode in accordance with the user's operation, loaded in the SDRAM 12 as YUV data and then displayed as a still or moving image on the LCD 13.

A flash memory 15 comprises a program and image memory built in the camera. The flash memory 15 has a program area where a plurality of different programs and various data to cause the CPU 2 to control the whole camera, and an image storage where a picked-up image, or compressed image data, is stored when the external memory (or memory card) 14 is not set.

The programs include ones that cause the CPU 2 to control the respective AE, AWB and AF functions, and ones for cause the CPU 2 to function as first determining means, conversion means, reference pixel setting means, second determining means and characteristic acquiring means included in the program area. The various data include a magnification table 100 of FIG. 2 composed of a plurality of optical zoom magnifications of 1-n usable in the camera 1 and a like number of color component magnifications of K(1)-K(n) inherent to the optical system of the lens block 3 corresponding to the plurality of color component magnifications. The program area also stores information on various functions of the camera set manually or automatically.

The CPU 2 is connected to a key-in unit 16 that includes a power source switch button, a shutter key that gives an image pickup command, a zoom operation button, and a mode switch key, which are not shown.

When performing a chromatism correction process of FIG. 3 in the record mode, the CPU 2 of the camera 1 prevents a possible deterioration in the image due to a chromatism present in the optical system (including the zoom and focus lenses) of the lens block 3, and more particularly, possible color blurs occurring in the contour of the object image mainly due to the magnification chromatism.

Figure 4A:
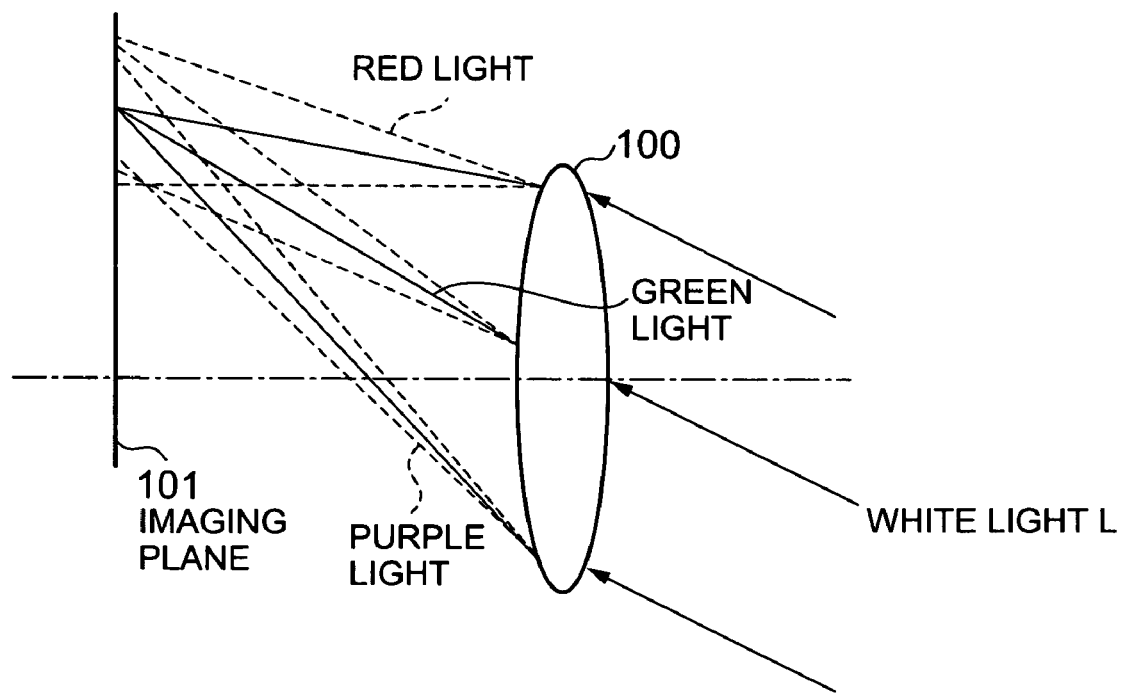
FIG. 4 schematically illustrates a magnification chromatism.
Figure 4B:
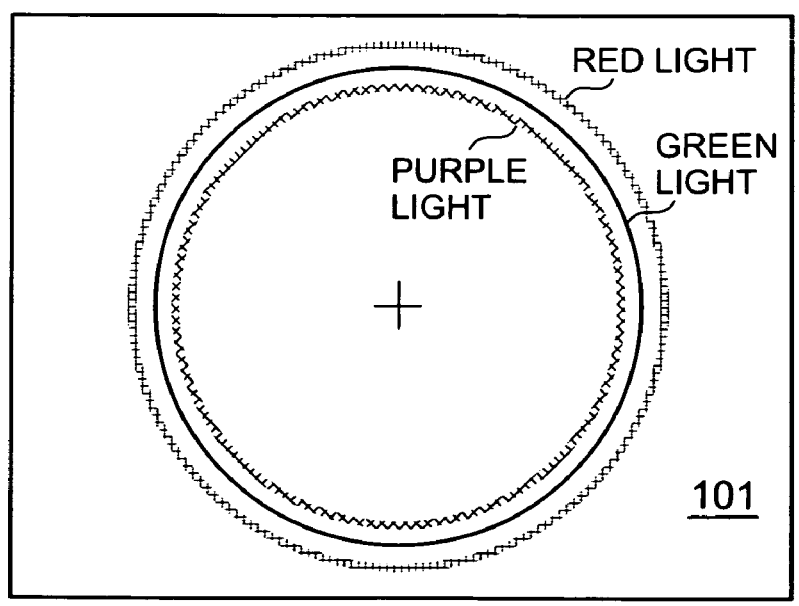

Briefly, as described in FIG. 4 the color blurs occur because the magnifications of the optical image focused by the lens system differ depending on the respective wavelengths of optical waves composing the image (or respective colors of the image) on the imaging plane or the photodetection face of the CCD 7. The order of arrangement and image magnifications of the respective formed wavelength images differ depending on the structure of the lens system used. Thus, in order to prevent the color blurs, the respective colored images are required to be reduced or expanded in size so as to eliminate differences in magnification around the center of the images coinciding with the optical axis of the optical system. In the present embodiment, in accordance with this principle the chromatism correction process is performed. As an example, an image whose magnification is reduced or increased is only a blue (B) component image that remarkably causes a color blur. Furthermore, the optical system of the lens block 3 should have a characteristic in which an enlarged blue (B) component image is displayed on the photodetection face of the CCD 7. Thus, the blue component image should be subjected to a size reduction processing.

Next, the specified chromatism correction process to be performed by the CPU 2 will be described with reference to FIGS. 3 and 5. In the record mode, the CPU 2 starts to perform this process at an appropriate time depending on a predetermined through or frame rate during display of a through image or pickup of a moving image or at an appropriate time depending on the pickup of a still image, thereby acquiring an optical zoom magnification (or information) at that time (step SA1) and sets or stores a color component magnification, K, corresponding to the acquired optical zoom magnification (step SA2). The color component magnification, K, is a magnification (having a positive value) at which the picked-up blue (B) component image is reduced in size as described above, and is acquired from the magnification table 100. The color component magnification, K, may be calculated from a predetermined expression concerned using the optical zoom magnification.

Subsequently, all the pixels of the image data obtained in the RGB conversion by the image processor 11 are sequentially subjected to steps SA3-SA9 (which are hereinafter referred to as a pixel value conversion processing as a whole). First, it is determined whether the luminance (or G) value of a specified pixel P0 is below a predetermined threshold. If so (YES in step SA3), in step SA4, a distance, r0, between the center of the image, O(0, 0) and the specified pixel P0, and an angle, θ, (see FIG. 5) between the X-axis and a straight line passing through the image center O and the pixel P0 are calculated from the following coordinate position of the pixel P0:

$$x0 = r0 \cos \theta \quad (1)$$

$$y0 = r0 \sin \theta \quad (2)$$

In the determination in step SA3, the luminance value of the specified pixel P0 is calculated from the RGB data values. FIG. 5 illustrates that the specified pixel P0 is in a first quadrant where the image center O(0, 0) coincides with the origin.

Then in step SA5, a distance, dr, between the specified pixel P0 and a pixel PB, which is hereinafter referred to as "reference pixel", (not yet set at this time) selected on the opposite side of the specified pixel P0 from the image center O(0, 0) on the straight line passing through the image center O(0, 0) and the specified pixel P0 is calculated based on the calculated distance, r0, and the color component magnification, K, set in step SA2 in accordance with:

$$dr = K \times r0 \quad (3)$$

Furthermore, a distance, r, between the image center O and the reference pixel PB is calculated in accordance with:

$$r = r0 + dr \quad (4)$$

Furthermore, in step SA6 the coordinate position (x, y) of the reference pixel PB is calculated from:

$$x = r \cos \theta \quad (5)$$

$$y = r \sin \theta \quad (6)$$

and a corresponding pixel of the image at that coordinate position (x, y) of the reference pixel PB is selected and set as the reference pixel PB.

Then, the B (or blue component) value of the specified pixel P0 is compared to that of the specified reference pixel PB. When the B value of the specified pixel P0 is greater (YES in step SA7), it is replaced with that of the reference pixel PB (step SA8). More specifically, beside the image data subjected to the RGB conversion by the image processor 11 and stored temporarily at a location in the SDRAM 12, the same image data as the former image data is stored temporarily for correcting purposes at another location in the SDRAM 12. Then the B value of the specified pixel P0 of the image data for the correcting purposes is replaced with the B value of the reference pixel PB.

When the B value of the pixel P0 is less than that of the reference pixel PB (NO in step SA7), it is determined whether all the pixels have been processed as respective specified ones (step SA9). If not (NO in step SA9), control returns to step SA3 where the pixel value conversion processing is repeated on the remaining pixels as the respective specified ones. When the determination in step SA3 is NO and the luminance value of the specified pixel P0 is not below the predetermined threshold, control immediately passes to step SA9 without performing the processing of steps SA4-SA8.

When the pixel value conversion processing on all the pixels has been completed (YES in step SA9), the image data which comprises the RGB pixel data having a luminance value below the predetermined threshold value and the B values replaced with that of the reference pixel PB, is employed as the picked-up image data to be subjected to the YUV conversion in the image processor 11 instead of the image data subjected to the RGB conversion by the image processor 11 (step SA10), thereby terminating the chromatism correction process.

Figure 6A:
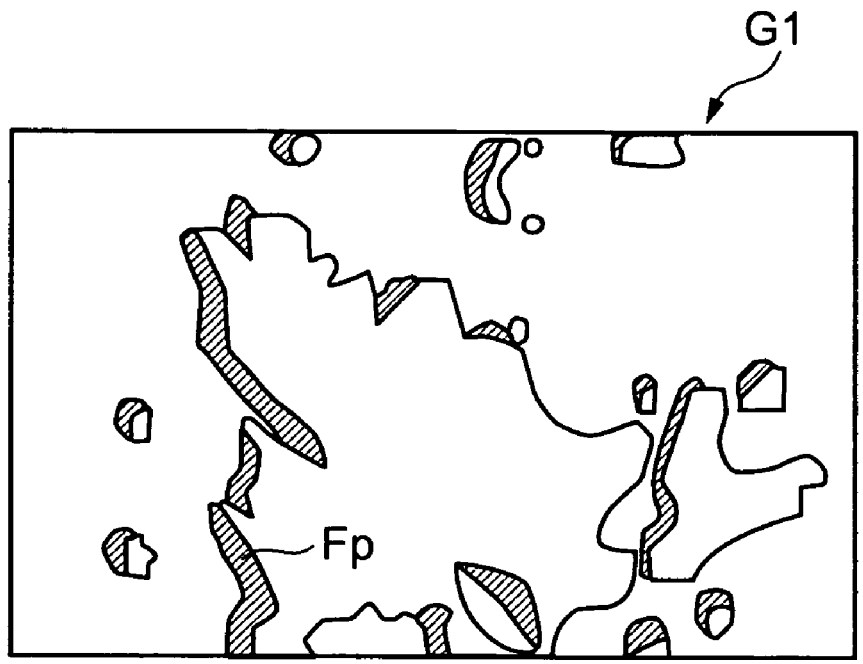
FIG. 6A illustrates an original image on which no chromatism correction process is performed.
Figure 6B:
FIG. 6B illustrates a corrected image on which the chromatism correction process was performed.

By such chromatism correction process, color blurs in the contours of the through, still and moving images picked up through the optical system (including the zoom and focus lenses) in the record mode are prevented from occurring. FIG. 6A illustrates an (original) image G1 which is not yet subjected to the chromatism correction process. FIG. 6B illustrates an (corrected) image G2 obtained in the chromatism correction process. FIGS. 6A and 6B each schematically illustrate a part of a second quadrant of a scene which the sky appears partly in a mass of leaves of a tree.

In the original image G1 of FIG. 6A, the B component of the sky having high luminance deviates into the left contour parts of the whole mass of leaves, thereby producing purple edging FP (shown hatched in FIG. 6A) due to color blur. It is to be noted that since the image shown is in the second quadrant, the edging FP occurs at the upper left edge of the image. In contrast, in the present embodiment such edging FP is prevented effectively from occurring, thereby obtaining the corrected image G2 of FIG. 6B.

Figure 7A:
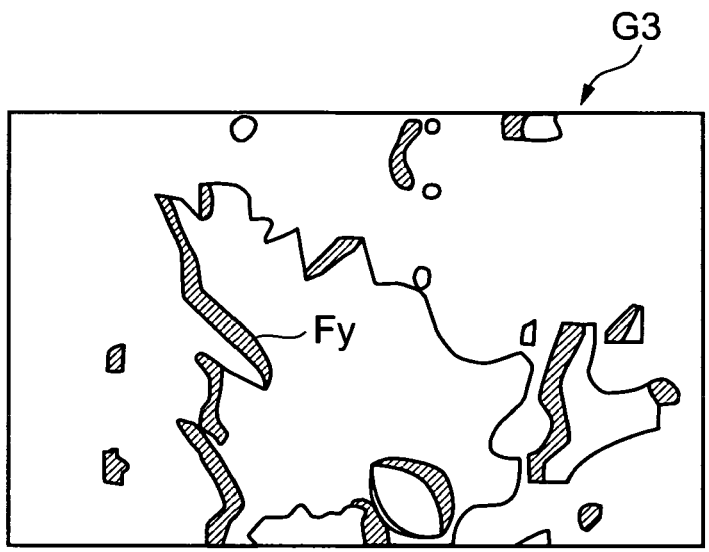
FIGS. 7A, 7B and 7C each illustrate a corrected image subjected to a different chromatism correction process.

While in the embodiment we have illustrated in the chromatism correction process both the step SA3 for limiting the specified pixels P0 whose B values should be changed to that of the reference pixel PB to ones having a luminance value lower than the threshold, which is hereinafter referred to as "luminance threshold limitation" and the step SA7 for limiting the specified pixels P0 to ones having B values greater than that of the reference pixel PB, which is hereinafter referred to as "reference B value limitation", only the "luminance threshold limitation" (step SA3) may be performed. FIG. 7A shows a corrected image G3 obtained in that case. Even in this case, edging FP occurring due to the color blurs in the original image G1 is effectively prohibited as in the embodiment, although some yellow edgings Fy (shown hatched in FIG. 7A) appear at the lower right-hand contour parts of the whole mass of leaves in the sky part on the side of the image center, or on the lower right side of the image, because only the R and G components of the sky color are substantially saturated but its B component (or value) is unsaturated along the lower right-hand contour parts of the whole mass of leaves in the sky part although all the components R, G and B are substantially saturated in the remainder of the sky part in FIG. 7A.

Figure 7B:
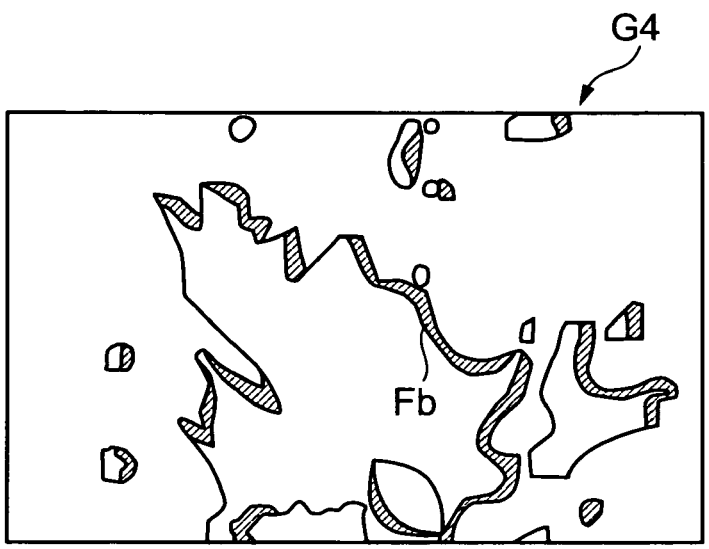

Conversely, only the "B-value limitation step" (step SA7) may be performed. FIG. 7B shows a corrected image G4 obtained in this case. In this image, there are no yellow edgings Fy such as are present in the sky part and purple edgings FP such as were present in the original image G1 are reduced. However, new blue edgings Fb (shown hatched) occur on the upper left side of the whole mass of leaves in the image G4.

Figure 7C:
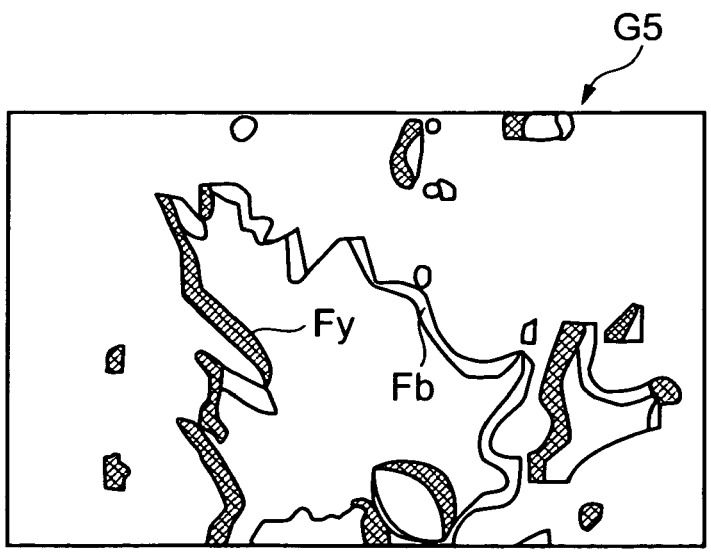

Furthermore, FIG. 7C shows a corrected image G5 obtained when none of the luminance threshold limitation (step SA3) and the reference B value limitation (step SA7) were employed, or the B value of the reference pixel was used unconditionally for all the pixels. In this case, the purple edgings Fp are reduced. However, new yellow edgings Fy occur in the sky part and blue edgings Fb occur in the contour parts of the mass of leaves.

While in the present embodiment the blue (B) component image alone is illustrated as reduced, thereby preventing remarkable color blurs from otherwise occurring in the contour of the image due to the magnification chromatism, the blue (B) component image may be reduced and a red (R) component image may be expanded. In this case, for the red (R) component, a negative color component magnification, K, is used and a red reference pixel PR (not shown) is set between the image center O and the specified pixel P0. When the optical system has a characteristic in which a reduced optical blue image is displayed on the photodetection face of the CCD 7 of FIG. 4, the blue and red images are required to be expanded and reduced, respectively.

While in the present embodiment the reference pixel PB is set for the predetermined specified pixel P0 that is subjected to both the luminance threshold limitation (step SA3) and the reference B value limitation (step SA7) and the B value of the specified pixel P0 is replaced with the B value of the reference pixel PB, the following method may be used instead. For example, the B and R values of the specified pixel P0 may be increased or decreased by a given value depending on the optical zoom magnification concerned or multiplied or divided by a given coefficient depending on the optical zoom magnification.

Embodiment 2

A second embodiment of the present invention will be described. A program that causes the CPU 2 to perform a chromatism correction process different from that of the first embodiment in the record mode is stored in the program area of the flash memory 15 of the FIG. 1 camera. In this case, the CPU 2 functions as first determining means, converting means, reference pixel setting means, second determining means, characteristic acquiring means, confirm pixel setting means, third determining means, first distance calculating means and second distance means.

Figure 8:
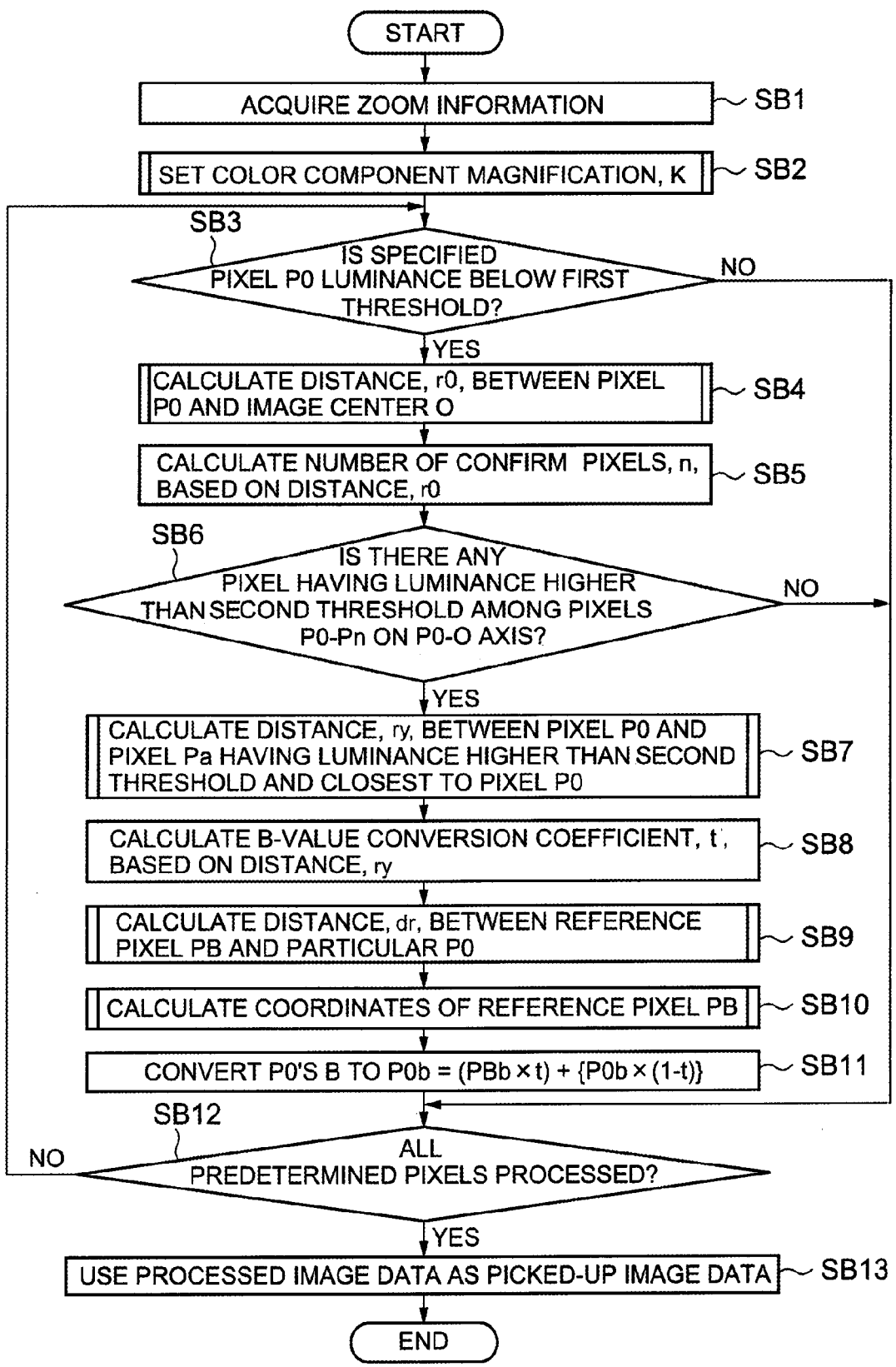
FIG. 8 is a flowchart indicative of a chromatism correction process to be performed in a second embodiment.

The chromatism correction process to be performed by the CPU 2 in the present embodiment will be described with reference to FIGS. 8 and 9. As in the first embodiment, in the record mode the CPU 2 starts to perform this process at an appropriate time depending on a predetermined through or frame rate during the display of the through image or during the pickup of a moving image or at an appropriate time depending on the pickup of a still image and acquires an optical zoom magnification at that time (step SB1), and then sets or stores a corresponding color component magnification, K, (step SB2). The color component magnification, K, is a positive value at which the picked-up blue image is reduced. The magnification, K, is taken from the magnification table 100 and may be calculated from a predetermined mathematical relation using the optical zoom magnification.

Subsequently, the processings of steps SB3-SB12 are performed sequentially on alternate pixels selected in vertical and horizontal directions from the image data subjected to the RGB conversion by the image processor 11, which is hereinafter referred to as pixel value conversion processing. First, it is confirmed whether the luminance or G value, of a specified pixel P0 is below a first predetermined threshold. If so (YES in step SB3), in step SB4 a distance, r0, between the image center, O(0, 0), and the specified pixel P0 and an angle, θ, (FIG. 9) between the X-axis and a straight line passing through the image center O and the specified pixel P0 are calculated based on the following coordinate position of the pixel P0:

$$x0 = r0 \cos\theta \quad (1)$$

$$y0 = r0 \sin\theta \quad (2)$$

In the determination of step SB3, the luminance value of the specified pixel P0 is calculated from the values of the RGB data. Then, an appropriate number of (n) pixels are selected as a like number of confirm pixels P1-Pn from among the pixels present between the image center O(O, 0) and the specified pixel P0 depending on the distance, r0, between the image center O(0, 0) and the specified pixel P0 on a (radial) straight line passing through the image center O(O, 0) and the specified pixel P0 (step SB5). In this case, the confirm pixel Pn is adjacent to the specified pixel P0. As the distance, r0, increases, the number of confirm pixels to be selected, n, should increase.

Figure 9:
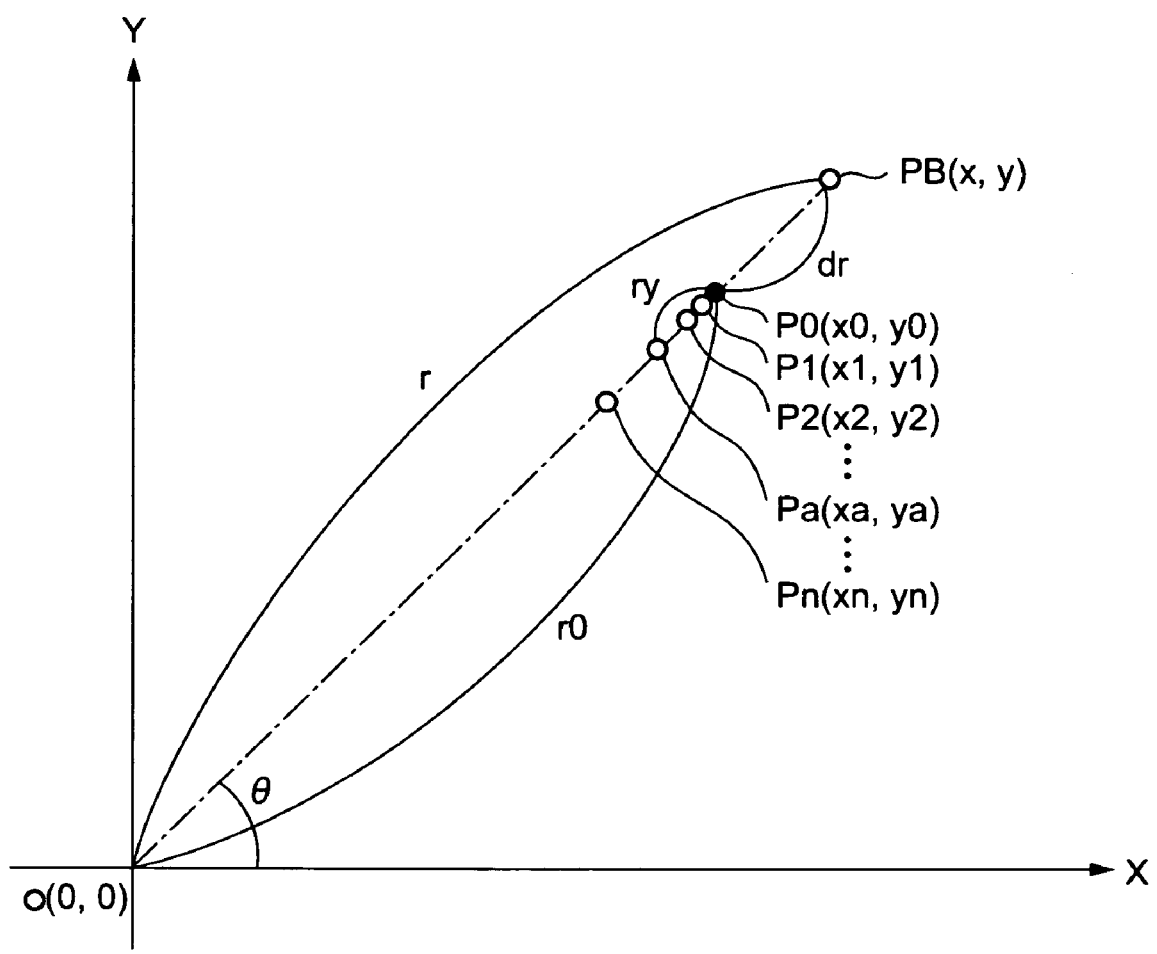
FIG. 9 illustrates a positional relationship between pixels of an image involved in the pixel value conversion processing in a plane coordinate system in the second embodiment.

Next, as shown in FIG. 9, it is determined whether there are one or more pixels whose luminance values are equal to, or higher than, a predetermined second threshold among the n confirm pixels P1-Pn placed between the specified pixel P0 and the image center O(0, 0) on the (radial) straight line passing through the image enter O(0,0) and the specified pixel P0, which is hereinafter referred to as "second luminance determination" (step SB6). The second threshold may be equal to, or different from, the first one used in step SB3. When the luminance values of the pixels are equal to, or higher than, the second threshold (YES in step SB6), in step SB7 a distance, ry, between the specified pixel P0 and a particular pixel Pa nearest to the pixel P0 is calculated from:

$$ry = |x0 - xa|/\cos\theta \quad (7)$$

where x0 and xa are the coordinates of the pixels P0 and Pa, respectively, on the X-axis.

Figure 5:
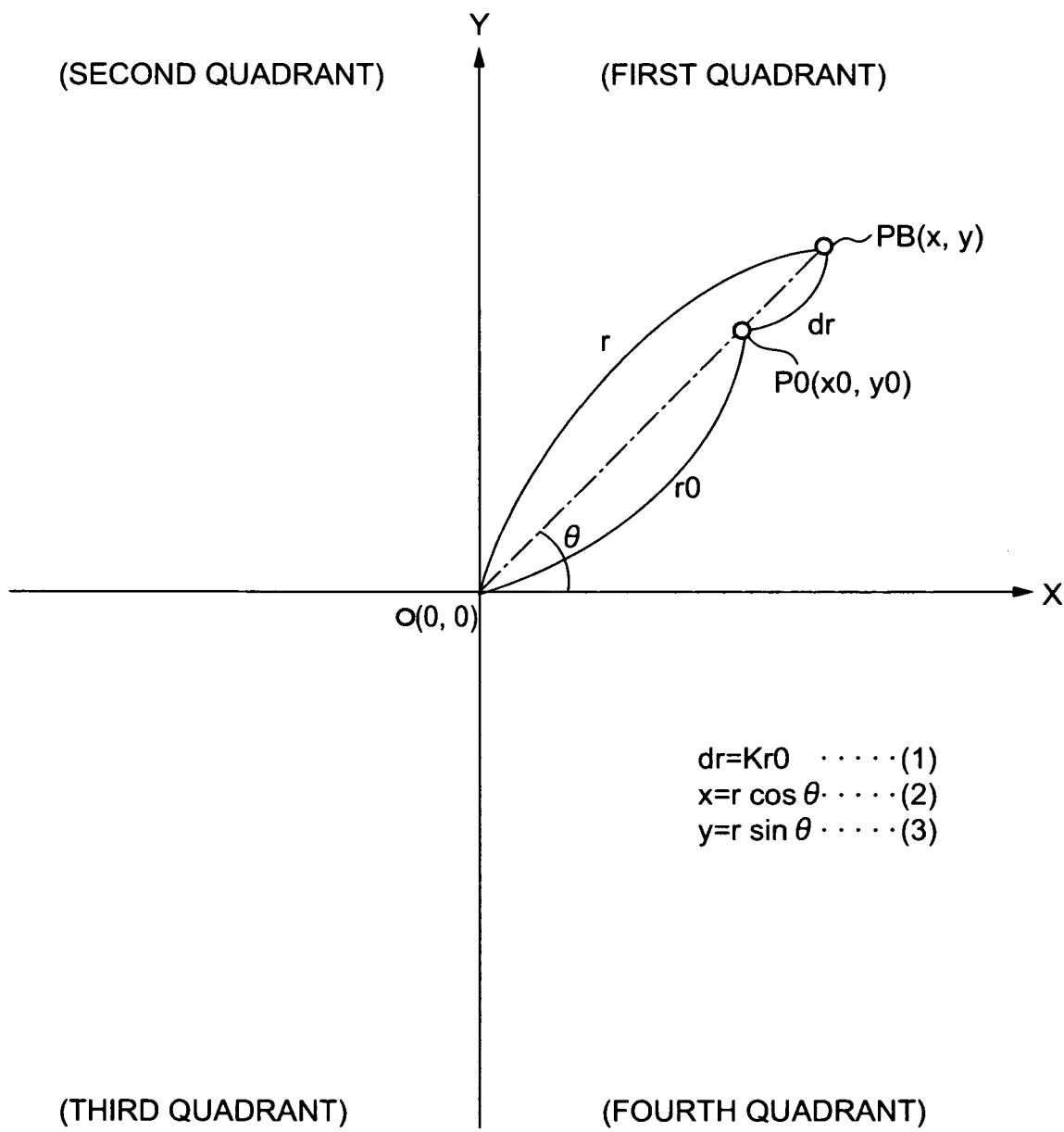
FIG. 5 illustrates a positional relationship between pixels of an image involved in a pixel value conversion processing in a plane coordinate system in the first embodiment.

Like FIG. 5, FIG. 9 shows that the specified pixel P0 is in a first quadrant with the image center O(0, 0).

Then, a B-value conversion coefficient, t, for the specified pixel P0 is selected in 0<t≦1 in consideration of the distance, ry (step SB8). In this case, as the distance, ry, increases, the B-value conversion coefficient, t, should decrease.

In step SB9, a distance, dr, between the specified pixel P0 and a (reference) pixel PB (at this stage, unfixed) positioned outside the specified pixel P0 on a straight radial line passing through the image center O(0, 0) and the specified pixel P0 is calculated as in the first embodiment from:

$$dr = K \times r0 \quad (3)$$

Furthermore, in step SB10 a distance, r, between the image center O(0, 0) and the reference pixel PB is calculated from:

$$r = r0 + dr \quad (4)$$

Then, in step SB10 the coordinate position (x, y) of the reference pixel PB is calculated based on the distance, r, and the angle, θ, between the X-axis and the straight line passing through the image center O and the specified pixel P0 from:

$$x = r \cos\theta \quad (5), \text{ and}$$

$$y = r \sin\theta \quad (6)$$

Then, the reference pixel PB is determined and set.

Then, the B (or P0b) value of the specified pixel P0 is converted to:

$$P0b = (PBb \times t) + \{P0b \times (1-t)\} \quad (8)$$

where PBb is the B value (PBb) of the reference pixel PB and t is the B-value conversion coefficient calculated in step SB8 (step SB11). That is, the B value of the specified pixel P0 is weighted in accordance with the distance, ry, between the specified pixel P0 and the particular pixel Pa such that as the distance, ry, increases or the B-value conversion coefficient, t, decreases, the B value of the pixel P0 is converted to a value closer to the original B value influenced not less by the reference pixel PB between the original B value of the pixel P0 and the B value of the reference pixel PB. This conversion is performed by replacing the B value of the specified pixel P0 of the image data, subjected to the RGB conversion by the image processor 11 and stored temporarily for correcting purposes at a location of the SDRAM 12 where the same image data as just mentioned is stored at another location, with the P0b value calculated in accordance with the expression (8).

Then, it is determined whether the processing of steps SB3-SB12 on all the alternate pixels has been completed. If not (NO in step SB12), control returns to step SB3, and then the pixel value conversion processing is repeated on the remaining pixels.

Meanwhile, when the determination in step SB3 is NO and the luminance value of a specified pixel P0 is not below the predetermined threshold and when the determination in step SB6 is NO and the n pixels P1-Pn have no luminance value higher than the second threshold, control immediately passes to step SB12 without performing the processing of steps SB4-SB11.

When the pixel value conversion processing for all the predetermined pixels has been terminated (YES in step SB12), the image data including the pixel or RGB data satisfying the conditions of steps SB3 and SB6 and having the converted B value is employed as picked-up image data instead of the image data subjected to the RGB conversion by the image processor 11. That is, the former image data is employed as subjected to the YUV conversion in the image processor 11 (step SB13), thereby terminating the chromatism correction process.

As a result, also in the present embodiment color blurs are prevented which occur in the contours of the through, still and moving object images acquired in the record mode due to the chromatism of the optical system including the zoom and focus lenses.

While in the present embodiment the pixel value conversion processing of the steps SB3-SB12 is illustrated as performed on alternate pixels in the vertical and horizontal direction of the image data subjected to the RGB conversion, the pixel value conversion processing may be performed on all the pixels. However, performing the pixel value conversion processing on the alternate pixels reduces a load to be processed by the CPU 2.

While in the present embodiment only the blue component image is generally illustrated as reduced in size, thereby preventing a remarkable color blur from otherwise occurring in the contour of the image due to the magnification chromatism, the red and blue component images may be expanded and reduced, respectively, to prevent color blurs. In this case, for the red component image the color component magnification, K, should have a negative value and the red reference pixel PR and a plurality of confirm pixels P1-Pn containing the particular pixel Pa should be selected and set on the opposite side of the specified pixel P0 from the image center. When the optical system has a characteristic in which a smaller blue component optical image is displayed on the photodetection face of the CCD 7 as in the example of FIG. 4, the blue and red component images should be expanded and reduced, respectively.

While we have illustrated, in the embodiment, both the luminance threshold limitation similar to that (step SB3) performed in the first embodiment where the specified pixels P0 whose B values should be converted are limited to ones having luminance values lower than the threshold value and the second luminance threshold limitation (step SB6) in which the respective specified pixels P0 whose B values should be converted are limited to ones having luminance values higher than the second threshold in the plurality of confirm pixels P1-Pn arranged adjacent to the pixel P0 (step SB6), the first-mentioned luminance threshold limitation (step SB3) may be disused and only the second luminance threshold limitation may be performed.

In addition to the same processing as the first-mentioned and second luminance threshold limitation, in the present embodiment we may perform the same reference B value limitation as described in the first embodiment including, for example, the FIG. 3 step SA7 immediately before the step SB11, thereby limiting the specified pixels P0, whose B values should be converted, to ones having B values smaller than that of the reference pixel PB or perform the second luminance threshold limitation and the reference B value limitation alone.

While in the embodiment the number of confirm pixels P1-Pn, n, is illustrated as changing in proportion to the distance, r0, between the image center O(0, 0) and the specified pixel P0, the processing of step SB5 may be disused and the number of confirm pixels may be fixed to a predetermined number.

While the B value of the specified pixel P0 subjected to the second luminance threshold limitation is illustrated as converted to a value between the B value of the pixel P0 and that of the reference pixel PB, the B value of the pixel P0 may be converted to, or replaced with, that of the reference pixel PB as in the first embodiment. Also in this case, the number of confirm pixels P1-Pn, n, may be variable as in the present embodiment or otherwise fixed.

Furthermore, while in the embodiment the B value of the pixel P0 subjected to the second luminance threshold limitation is illustrated as changed depending on the distance, ry, between the specified and particular pixels P0 and Pa, the B value of the pixel P0 may be a value not influenced by the distance, ry. To this end, the processing of steps SB7 and SB8 is disused.

While in the present embodiment it is illustrated that the reference pixel PB is selected from the pixels and set for the predetermined specified pixel P0 that is subjected to the first and second threshold limitations processing and that the B value of the pixel P0 is replaced with the value calculated in accordance with the expression (8), or converted to a different one, the following processing may be performed alternatively.

For example, the B (and R) value(s) of the specified pixel P0 may be converted to a value(s) including the B (and R) value(s) of the specified pixel P0 increased or decreased by a constant component value(s) depending on the optical zoom magnification or to a value(s) including the B (and R) value(s) multiplied or divided by a given coefficient(s) depending on the optical zoom magnification.

While in the first and second embodiments the application of the present invention to the digital camera 1 having the optical zoom function has been illustrated, the present invention may apply to digital cameras having no optical zoom magnification. In this case, the color component magnification, K, may be stored as a fixed value in the flash memory 15.

With the digital cameras of the embodiment 1 and 2 where the optical system includes the focus lens and hence the focus position as well as the zoom magnification is reflected in the magnification chromatism characteristic involving focusing and magnifications of the respective different wavelength images, the B (and R) value(s) of the specified pixel P0 is (or are) converted to another (or others) in consideration of the focus position.

Embodiment 3

The embodiment 3 relates to a personal computer according to the present invention.

Figure 10:
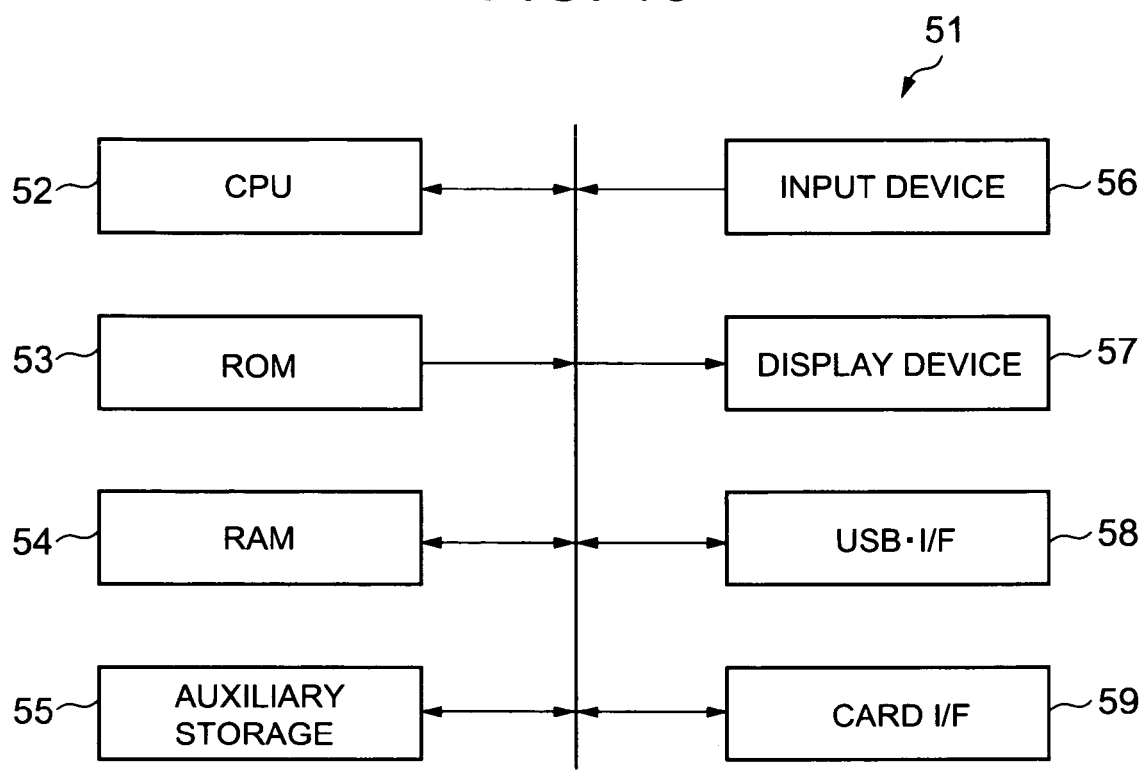
FIG. 10 is a block diagram of a personal computer used in a third embodiment.

FIG. 10 is a block diagram of a general personal computer 51 that comprises a CPU 52 connected to a ROM 53, a RAM 54, an auxiliary storage device 55, an input device 56 including a mouse and a keyboard (which are not shown), a display 57 such as a CRT or LCD, a USB (Universal Serial Bus) interface 58, and a built-in or external card interface 59 having a slot through which various memory cards are insertable directly or through corresponding adapters.

The auxiliary storage device 55 is a large-capacity storage device such as a hard disk drive and has stored an operating system (OS) and other various application programs for causing the CPU 52 to function as determining means, converting means, characteristic acquiring means, reference pixel setting means, comparing means, and limiting means and as requested, causing the CPU 52 to perform processings to be described later. The auxiliary storage device 55 has especially stored a magnification table 200 of FIG. 11 including the type names of a plurality of different digital cameras having an optical zoom (AAA, BBB, . . . ), a plurality of different optical zoom magnifications, 1-n, inherent to each type of camera, and a like number of color component magnifications, K(1)-K(n), corresponding to the plurality of zoom magnifications, respectively. Each color component magnification is a reduction or expansion rate at which the blue component image is reduced or expanded as in the first embodiment and takes a positive or negative value depending on the type of digital camera used.

Figure 12:
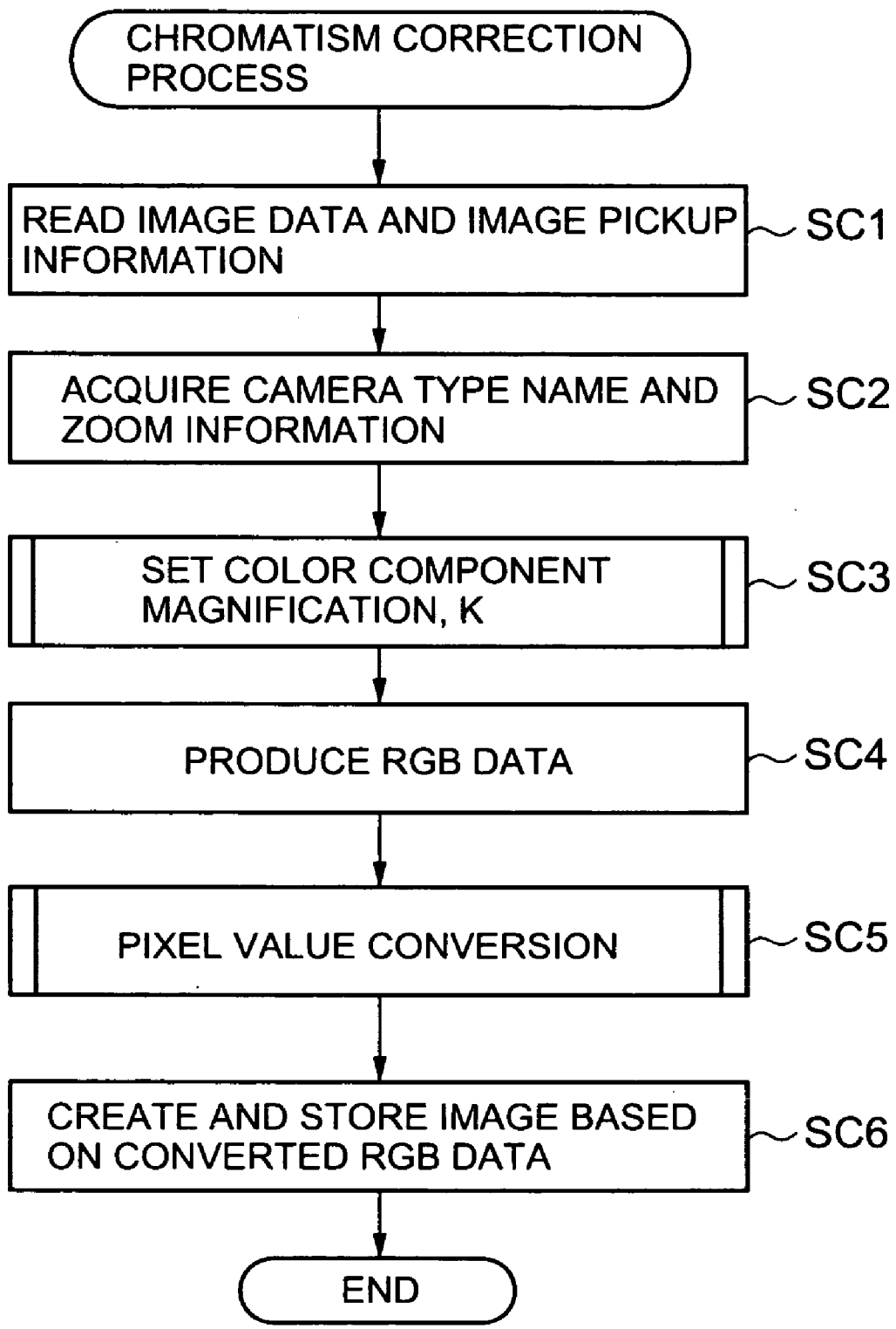
FIG. 12 is a flowchart indicative of a chromatism correction process to be performed in the third embodiment.

The chromatism correction process to be performed by the CPU 52 on a recorded image specified by the user when the image processing program is running will be described with reference to a flowchart of FIG. 12. In the following description, it is assumed that the image to be processed is picked up by a digital camera of the specified type recorded in the magnification table 200 and read from a memory card through the card interface 59 into the auxiliary storage device 55. It is also assumed that the image is recorded as an image file having a data structure, for example, conforming to the DCF standards. It is further assumed that the image file includes image data itself, and various image pickup information incidental to the image data, more particularly, the maker's name, camera type name, exposure time, F value, ISO sensitivity, optical zoom magnification and photometry system name. While in the DCF standards the optical zoom magnification represents focal distance, it is expressed herein as an optical zoom magnification for convenience sake. This applies to the optical zoom magnifications composing part of the magnification table 200.

The chromatism correction process to be performed by the CPU 52 will be described next. First, the CPU 52 reads image data on the recorded image to be processed and its associated image pickup information from the auxiliary storage device 55 (step SC1). The type name of the camera used and its zoom information (or optical zoom magnification) are acquired from the image pickup information (step SC2). Then, the corresponding color component magnification, K, is acquired from the magnification table 200 and set or stored as a processing parameter (step SC3).

Subsequently, RGB data for each pixel is produced from the image data read in step SC1 (step SC4). Then, the pixel value conversion processing having the same content as the processing of steps SA3-SA9 of the FIG. 3 flowchart described in the first embodiment is performed on the acquired RGB data (step SC5). Then, image data to be recorded is produced based on the converted R, G and B data and stored as an image file with the same name as, or a different name from, the original one in the auxiliary storage device 55 (step SC6).

Thus, in the present embodiment color blurs that would otherwise occur in the contour of the image picked up by the camera due to the chromatism of the optical system of the camera are corrected effectively. In addition, this applies to the image picked up by digital cameras of different types.

While in the present embodiment the image to be processed is illustrated as picked up by the digital cameras with the optical zoom, the present invention can address the images picked up by digital cameras without the optical zoom if the magnification table 200 includes the type names of the latter digital cameras and the corresponding single color component magnifications (in this camera, the optical zoom magnification is 1 alone).

While in the embodiment the picked-up images whose data having added image pickup information including the camera type names and related optical zoom magnifications are illustrated as processed, the present invention also can address images picked up by the digital cameras and having no additional image pickup information or having missed such image pickup information. To this end, the following method may be used.

First, the magnification table 200 should, for example, include additional regular color component magnifications determined fixedly in correspondence to the type names of the digital cameras irrespective of the optical zoom magnifications. Thus, in the chromatism correction process, when the image data of a recorded image to be processed and the image pickup information concerned are read in step SC1, a relevant color component magnification is set in steps SC2 and SC3 if the image pickup information is added or read out. If not, all the type names of the cameras stored on the magnification table 200 are displayed simultaneously, thereby causing the user to select the type name of camera that picked up the image. Then, a regular color component magnification corresponding to the selected type name of the camera is set for processing purposes.

While in the embodiment the pixel value conversion processing of step SC5 is illustrated as identical to the steps SA3-SA9 (see FIG. 3) in the chromatism correction process of the first embodiment, the pixel value conversion processing may be identical to the processings of steps SB3-SB12 (FIG. 8) of the chromatism correction process of the second embodiment. Also in this case, color blurs are corrected effectively which occur due to the chromatism in the contour of the image picked up by the digital cameras. In addition, this process applies to color blurs occurring in images picked up by digital cameras of different types. The pixel value conversion processing of this embodiment may be replaced with both the first and second luminance threshold limitations and the reference B value limitation, as mentioned above, or both the second luminance threshold limitation and the reference B value limitation, as mentioned above. The details of the remainder of the pixel value conversion processing described in the first and second embodiments apply as just they are to the present embodiment.

The chromatism correction process described in the present embodiment may be performed in personal computers as well as digital cameras. In this case, the chromatism correction process may be performed automatically or as required when the recorded image is reproduced or subjected to edition such as trimming.

Embodiment 4

An embodiment 4 of the present invention will be described which relates to a digital camera with an interchangeable image pickup lens. More particularly, the camera of this embodiment is a version of the camera of FIG. 1 where a lens unit including the lens block 3 and the motor 4 that includes submotors for zooming and focusing purposes (not shown) is interchangeable manually with another on the camera body.

In this camera, the type of lens unit attached is detectable on the side of the camera body and more particularly, the lens unit has a built-in memory that has stored lens information such as a lens number indicative of the lens unit. When the lens unit is attached to the camera body, the built-in memory is electrically connected together with the motor 4 to the camera body.

The flash memory 15 has a program area which has stored a program that causes the CPU 2 to perform a lens information set processing to be described later and a chromatism correction process and the following data to be used in the chromatism correction process. In this embodiment, the data includes a version of the FIG. 11 magnification table 200 where the camera type names are replaced with the corresponding lens numbers. Even in the magnification table of this embodiment, the color component magnifications shown therein are data indicative of the reduction or expansion rates of the blue component images similar to those in the first embodiment, and each take a positive or negative value depending on the type of lens unit used.

Figure 13:
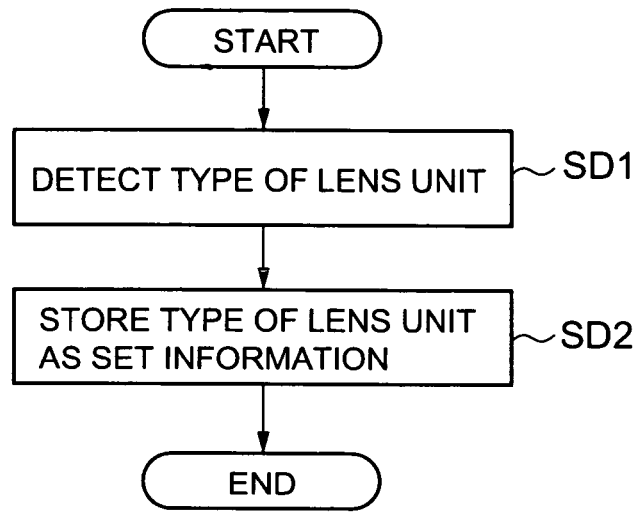
FIG. 13 is a flowchart indicative of a lens information set processing to be performed in a fourth embodiment.

Operation of the present embodiment will be described next. FIG. 13 is a flowchart indicative of the lens information set processing to be performed by the CPU 2. When the power source is turned on or the record mode is set, the CPU 2 starts to perform the processing. Then, the CPU 2 acquires a lens number from the built-in memory of the lens unit attached in the camera body and immediately detects the type of the lens unit (step SD1). Then, the CPU 2 stores the detected type (or the lens number) of the lens unit along with other set information on the respective functions of the digital camera in the program area of the flash memory 15 (step SD2), and then terminates the processing.

Figure 14:
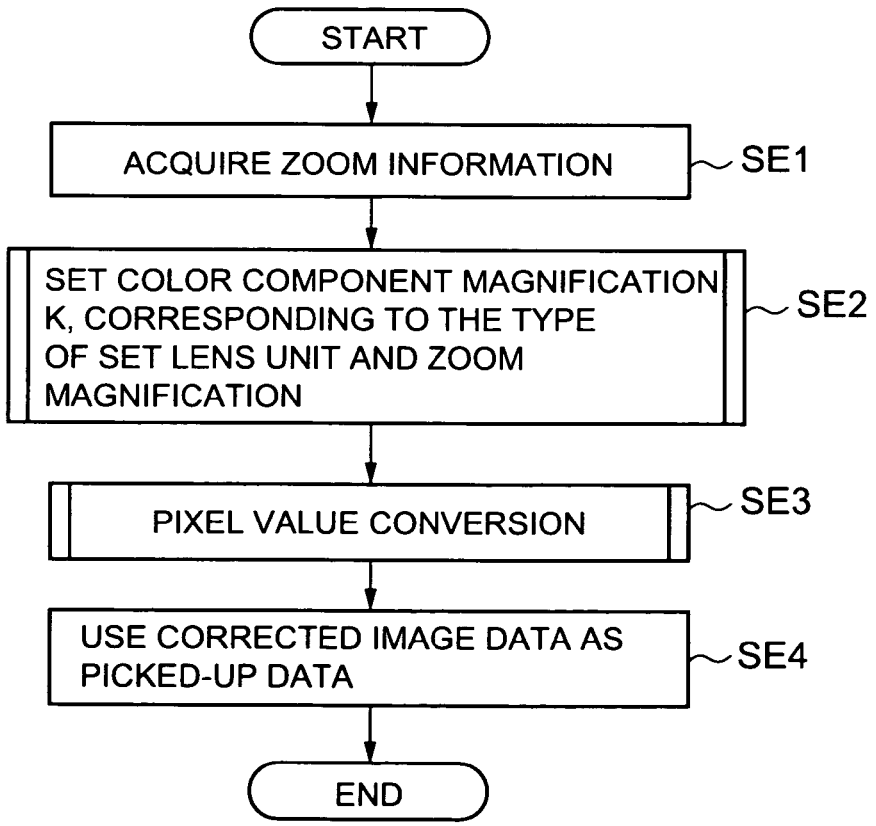
FIG. 14 is a flowchart indicative of a chromatism correction process to be performed in the fourth embodiment.

FIG. 14 is a flowchart indicative of the chromatism correction process to be performed by the CPU 2 in the record mode. In the record mode, the CPU 2 starts to perform this processing at an appropriate time depending on a through or frame rate during display of the through image or during pickup of a moving image or at an appropriate time depending on the start of image pickup of a still image, and then acquires information on the optical zoom magnification used at that time (step SE1). The CPU 2 then acquires the optical zoom magnification at that time, a color component magnification, K, corresponding to the lens unit set in the lens information setting process from the magnification table (not shown), and then sets them as processing parameters (step SE2).

Then, a pixel value conversion processing which has the same content as the processing of steps SA3-SA9 of the FIG. 3 flowchart described in the first embodiment is performed sequentially on all the pixels of the image data subjected to the RGB conversion by the image processor 11 (step SE3). Then, the resulting image data, or the image data including the RGB pixel data where the predetermined pixel's B value is changed, is handled as picked-up image data that should be subjected to the YUV conversion in the image processor 11 instead of the image data subjected to the RGB conversion in the image processor 11 (step SE4), thereby terminating the chromatism correction process.

Thus, also in this embodiment, color blurs are prevented from occurring in the contours of the through, still and moving images acquired in the record mode due to the chromatism of the optical system (including zoom and focus lenses), thereby producing the same beneficial effects as the first embodiment.

While we have illustrated that in the present embodiment the camera includes the removable lens unit having the built-in memory which has stored lens information such as lens numbers indicative of the types of lens units, and the flash memory 15 provided in the camera body having stored the magnification table of color component magnifications, K, corresponding to the optical zoom magnifications of the plurality of different lens units, the magnification table inherent to the optical system of the camera may be stored in the built-in memory of the lens unit instead of the lens information. In this case, the above-mentioned lens information set processing may be disused and the CPU 2 may directly read a color component magnification, K, corresponding to the optical zoom magnification at that time from the built-in memory and set the magnification, K, in the step SE2 of the chromatism correction process. Alternatively, instead of the lens information set processing, the CPU 2 may read the magnification table from the built-in memory of the lens unit and store the table at a predetermined location of the flash memory 15. In the record mode, the CPU 2 may also perform the same chromatism correction process as in the first embodiment.

While in the present embodiment we have illustrated that the pixel value conversion processing of step SE3 is identical to the processing of steps SA3-SA9 (see FIG. 3) of the chromatism correction process of the first embodiment, the pixel value conversion processing may be identical to the processing of steps SB3-SB12 (FIG. 8) of the chromatism correction process of the second embodiment. In this case, the present invention produces the same beneficial effects as in the second embodiment. The pixel value conversion processing of the present embodiment may be replaced with both the first and second luminance threshold limitation and the reference B value limitation, as mentioned above, or both the second luminance threshold limitation and the reference B value limitation, as mentioned above. The remainder of the pixel value conversion processing of the present embodiment is explained by relevant parts of the processings described concerning the first and second embodiments.

While in the first-fourth embodiments, application of the present invention to the digital cameras and personal computers has been illustrated, the present invention is further applicable to other image pickup devices such as digital video cameras and other image processors.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-258624 filed on Sep. 7, 2005, respectively, and each including specification, claims, drawings and summary. The disclosure of the above Japanese patent application is incorporated herein by reference in its entirety.

What is claimed is:

1. A chromatism correction apparatus for correcting a chromatism occurring in image data picked up by an image pickup device through an optical system, the apparatus comprising:
    first determining means for determining whether a specified one of pixels in an image based on the image data has a luminance value below a first predetermined luminance threshold;
    first calculating means for calculating a distance between the center of the image and the specified pixel;
    confirm pixel setting means for automatically selecting and setting a plurality of confirm pixels between the specified pixel and a center of the image in a first direction along a straight line passing through the specified pixel and the center of the image, the confirm pixels being automatically selected and set based on the distance between the center of the image and the specified pixel calculated by the first calculating means and regardless of a luminance value of said confirm pixels;
    second determining means for determining whether there is a particular confirm pixel having a luminance value higher than a second predetermined luminance threshold from among the plurality of confirm pixels set by the confirm pixel setting means, wherein the second predetermined luminance threshold is higher than the first predetermined luminance threshold;
    reference pixel setting means for automatically setting a pixel as a reference pixel on the image, the reference pixel being set with respect to the specified pixel in a second direction opposite the first direction along the straight line passing through the specified pixel and the center of the image, wherein a distance between the reference pixel and the specified pixel is set based on (i) a characteristic of a chromatism of the optical system and (ii) the distance between the center of the image and the specified pixel calculated by the first calculating means; and
    converting means for converting a pixel value of a predetermined color component of the specified pixel to a different pixel value based on a pixel value of a same color component of the reference pixel, only when the second determining means determines that the particular confirm pixel having the luminance value higher than the second predetermined luminance threshold exists.

2. The apparatus of claim 1,
    wherein a number of the plurality of confirm pixels increases in proportion to the distance calculated by the first calculating means.

3. The apparatus of claim 2, wherein:
    the particular confirm pixel is a closest confirm pixel closest to the specified pixel along the straight line passing through the specified pixel and the center of the image which is determined by the second determining means to have the luminance value higher than the second predetermined luminance threshold; and
    the different pixel value is a new pixel value between the pixel value of the predetermined color component of the specified pixel and the pixel value of the same color component of the reference pixel.

4. The apparatus of claim 1, wherein:
    the particular confirm pixel is a closest confirm pixel closest to the specified pixel along the straight line passing through the specified pixel and the center of the image which is determined by the second determining means to have the luminance value higher than the second predetermined luminance threshold; and
    the different pixel value is a new pixel value between the pixel value of the predetermined color component of the specified pixel and the pixel value of the same color component of the reference pixel.

5. The apparatus of claim 4, wherein:
    the new pixel value gets closer to the pixel value of the same color component of the reference pixel as the closest confirm pixel gets closer to the specified pixel; and
    the new pixel value gets closer to the pixel value of the predetermined color component of the specified pixel as the closest confirm pixel gets farther from the specified pixel.

6. A digital camera comprising the chromatism correction apparatus of claim 1.

7. The apparatus of claim 1, further comprising:
    second calculating means for calculating a distance between the specified pixel and the particular confirm pixel; and
    conversion coefficient calculating means for calculating a conversion coefficient for converting the pixel value of the predetermined color component of the specified pixel, the conversion coefficient being calculated based on the distance between the specified pixel and the particular confirm pixel calculated by the second calculating means;
    wherein the converting means converts the pixel value of the predetermined color component of the specified pixel to the different pixel value based on the conversion coefficient calculated by the conversion coefficient calculating means, as well as the pixel value of the same color component of the reference pixel.

8. The apparatus of claim 7, wherein the different pixel value is a new pixel value between the pixel value of the predetermined color component of the specified pixel and the pixel value of the same color component of the reference pixel, the new pixel value being weighted with the distance calculated by the second calculating means.

* * * * *